(12) United States Patent
Levecq et al.

(10) Patent No.: US 8,971,363 B2
(45) Date of Patent: Mar. 3, 2015

(54) METHOD AND DEVICE FOR SHIELDING A HIGH-POWER LASER APPARATUS AND HIGH-POWER-LASER OPTICAL SYSTEM EMPLOYING SUCH A DEVICE

(75) Inventors: Xavier Levecq, Gif sur Yvette (FR); Gilles Riboulet, Morsang sur Orge (FR)

(73) Assignees: Imagine Optic, Orsay (FR); Amplitude Technologies, Evry (FR)

( * ) Notice: Subject to any disclaimer, the term of this patent is extended or adjusted under 35 U.S.C. 154(b) by 1012 days.

(21) Appl. No.: 12/738,117

(22) PCT Filed: Oct. 13, 2008

(86) PCT No.: PCT/FR2008/051857
§ 371 (c)(1),
(2), (4) Date: Jul. 8, 2010

(87) PCT Pub. No.: WO2009/053642
PCT Pub. Date: Apr. 30, 2009

(65) Prior Publication Data
US 2010/0296534 A1 Nov. 25, 2010

(30) Foreign Application Priority Data

Oct. 15, 2007 (FR) ...................................... 07 58323

(51) Int. Cl.
*H01S 3/13* (2006.01)
*H01S 3/00* (2006.01)
(Continued)

(52) U.S. Cl.
CPC .............. *H01S 3/0078* (2013.01); *G02B 26/06* (2013.01); *G02B 27/46* (2013.01); *H01S 3/0014* (2013.01); *H01S 3/2316* (2013.01); *H01S 3/005* (2013.01)
USPC ....................... 372/29.023; 372/29.02; 359/16

(58) Field of Classification Search
CPC ............ H01S 3/10023; H01S 3/10076; H01S 3/10053; H01S 3/1307; H01S 5/5045; H01S 5/145; H01S 5/06246; H01S 3/0078; H01S 3/0014; H01S 3/2316; H01S 3/005; G02B 27/46; G02B 26/06
USPC ............................... 372/29.02, 29.023; 359/16
See application file for complete search history.

(56) References Cited

U.S. PATENT DOCUMENTS 4,005,935 A * 2/1977 Wang ......................... 250/201.9
4,233,571 A * 11/1980 Wang et al. ..................... 372/99
(Continued)

FOREIGN PATENT DOCUMENTS

WO    WO 8807778 A1 * 10/1988 ................. H01S 3/23
WO    WO 2006041444 A1 * 4/2006 ................. H01S 3/10

OTHER PUBLICATIONS

Thompson et al., "Optics Damage Inspection for the NIF," 1999, SPIE, vol. 3492, 921-932.*

(Continued)

*Primary Examiner* — Julio J Maldonado
*Assistant Examiner* — Joshua King
(74) *Attorney, Agent, or Firm* — Young & Thompson

(57) ABSTRACT

Method for shielding a high-power laser apparatus (S) in which a laser beam is generated and then amplified in at least a first amplification stage, including spatial filtering (4) of the amplified laser beam, phase correction (3) carried out on the laser beam before it is spatially filtered, and a measurement of the aberrations (7) on the laser beam. The phase of the beam is corrected so as to produce a beam having minimal aberrations after spatial filtering. The shielding device (D, D') implementing this method may in particular be employed in apparatus using an intense laser beam of high (terawatt) peak power and in proton therapy units.

25 Claims, 2 Drawing Sheets

(51) Int. Cl.
*G02B 26/06* (2006.01)
*G02B 27/46* (2006.01)
*H01S 3/23* (2006.01)

(56) References Cited

U.S. PATENT DOCUMENTS

| | | | |
|---|---|---|---|
| 4,902,980 A * | 2/1990 | O'Meara | 359/338 |
| 5,832,006 A | 11/1998 | Rice et al. | |
| 5,994,687 A | 11/1999 | Chanteloup et al. | |
| 6,038,239 A * | 3/2000 | Gabbert | 372/20 |
| 7,471,430 B1 * | 12/2008 | Andersen | 359/16 |
| 7,515,618 B2 * | 4/2009 | Franck | 372/30 |
| 2005/0201429 A1 | 9/2005 | Rice et al. | |
| 2010/0232007 A1 * | 9/2010 | Byren et al. | 359/291 |

OTHER PUBLICATIONS

Murray J. E., Milam D., Boley C. D., Estabrook K. G., et Caird J.A. (2000) "Spatial filter pinhole development for the National Ignition Facility", Applied Optics, 39 (9), pp. 1405-1420.

Celliers P.M., Estabrook K. G., Wallace R. J., Murray J. E., Da Silva L. B., MacGowan B. J., Van Wonterghem B. M., et Manes K. R. (1998) "Spatial filter pinhole for high-energy pulsed lasers", Applied Optics, 37 (12), pp. 2371-2378.

Hack H. et Neuroth N. (1982) "Resistance of optical and colored glasses to 3-nsec laser pulses", Applied Optics, 21 (18), pp. 3239-3248.

Kurnit N. A., Letzring S. A., Johnson R. P. (1999) "A high-damagethreshold pinhole for glass fusion laser application", Third Annual International Conference on Solid State Lasers for Application to Inertial Confinement Fusion, Proc. SPIE 3492, pp. 896-900.

Schwarz et al: (2006) "Low order adaptive optics on Z-Beamlet using a single actuator deformable mirror", Optics Communication, 264 (1), pp. 203-212, North-Holland Publishing Co., Amsterdam, NL, XP005567434.

"HiPER technical report—Baseline Facility Design" [Online,] 2007, pp. 101-123, Retrieved Apr. 16, 2008 from: URL:http://www.hiper-laser.org/docs/tdr/baselinelaser.pdf>, XP002476826.

International Search Report in Corresponding Application PCT/FR2008/051857 Dated Mar. 25, 2009.

French Search Report in Corresponding Application FR 0758323 Dated Apr. 18, 2008.

* cited by examiner

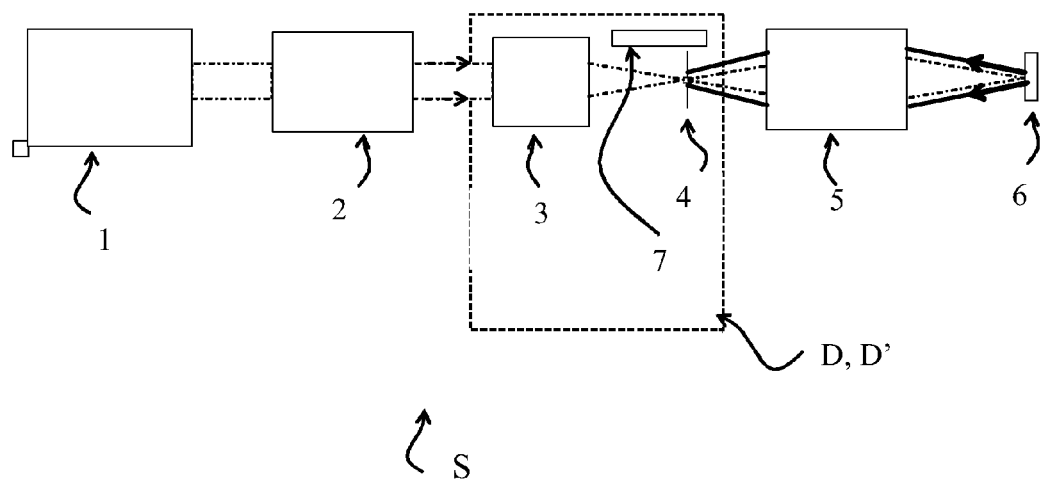
FIG.1
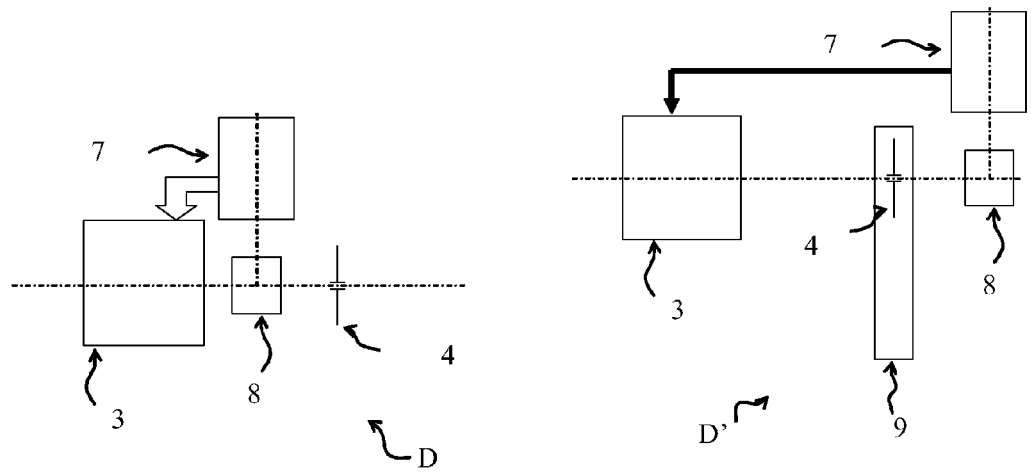
FIG.2
FIG.3

METHOD AND DEVICE FOR SHIELDING A HIGH-POWER LASER APPARATUS AND HIGH-POWER-LASER OPTICAL SYSTEM EMPLOYING SUCH A DEVICE

BACKGROUND OF THE INVENTION

1. Field of the Invention

The present invention relates to a method for shielding a high-power laser apparatus. It also relates to a shielding device using this method, as well as a high-power-laser optical system employing such a device.

The field of the invention is that of high-power lasers, and more particularly of ultra-intense lasers.

2. Description of the Related Art

Apparatuses based on ultra-intense lasers are subject to risks of damage. These risks are of two types:

During amplification of the pulse: when the distribution of pulse energy incident on an amplifier is non-uniform, and contains "hot spots", interaction with the crystal creates a very high risk of damage. Such damage leads to the stopping of the laser and the need to replace the damaged optics: this therefore causes delays, as well as costs that can amount to several tens of thousands of Euros when the damaged elements are the amplifier crystals or the compression gratings.

Beam return from the experiments: it is by no means rare that a part of the light reflected or generated during the interaction of the laser beam with the experimental target returns into the laser and is itself amplified. This phenomenon, uncontrolled and dependent on the type of target and its geometry, leads, when it occurs, to a high risk of damage of the optical elements of the laser circuit.

The solution currently used for combating the risks of damage is the use of a spatial filtering positioned in a focusing plane located in front of each of the amplifiers or sensitive optical elements to be shielded [1]. The smaller the spatial filter (diaphragm of any type) relative to the diffraction of the beam, the more effective its use is for reducing the risks of damage.

Conversely, the smaller the size of the spatial filter, the higher the energy loss of the incident beam, especially when the latter possesses optical aberrations and is not limited by diffraction. Moreover, when the power of the beam increases as it passes through the amplifiers, the beam fluence at the point of focusing (in the plane of the filter pinhole) becomes stronger and stronger, and the part of the energy that is blocked by the filter pinhole (since the beam is not limited by diffraction owing to the aberrations) can lead to the formation of a plasma and destruction of the pinhole (plasma then fusion and closing-up of the pinhole).

Thus, in fact laser specialists use, on high-power lasers, filter pinholes of large diameter compared with the diffraction limit, for two reasons: to avoid losing too much flux and to shield the pinhole from destruction at each firing. Therefore neither homogenization of the energy distribution at the entrance of the amplifiers, nor shielding against beam returns from the target is optimal. Thus, the filter pinhole technique currently used is not satisfactory for dealing with the problems of shielding the optical elements of lasers.

The filter pinholes used commonly are flat metal disks with a calibrated pinhole at the centre, mounted on a precision movement in the three axes so that they can be aligned on the optical axis of the laser beam. This solution has the drawback that it creates a plasma on the edges of the disk, which eventually destroys it, if the energy deposited reaches the damage threshold. Furthermore, the damage threshold of the disk largely depends on the optical quality of the surface. In ultra-intense and ultra-short systems, starting from a repetition frequency of a few Hz, and starting from input energies of a few hundred millijoules, the filter pinhole is damaged irreversibly. The solution proposed for filtering at high fluence is to use pinholes, metallic or dielectric, of conical shape, to increase the area of interaction between the beams to be rejected and the spatial filter. The material of which the filter pinhole is composed implies various filtering schemes and behaviours from the standpoint of flux resistance.

Conical filter pinholes made of metal [1, 2] are used in laser circuits with very low repetition frequency of the NIF and LMJ type. Filter pinholes of conical shape were validated in more than 500 firings on the pilot installation of the LMJ, the Laser Integration Line (LIL). Elimination of the high spatial frequencies is based on the principle of deflection by the subdense plasma created by the interaction of the beam with the walls of the cone. Modelling of the pinhole and of the effect of the energy deposited, contained in the high spatial frequencies, is necessary because plasma expansion determines the dynamics of the reflecting surface. This approach makes the engineering of the filter pinhole very simple because delegating the role of reflector to the plasma makes it possible to relax the constraints on the quality of the reflecting walls of the pinhole. This configuration has never been validated at high repetition frequency. The energy conditions of operation of these pinholes must be very well defined and stable. The fluence incident on the walls of the pinhole must be sufficient to create a plasma, as a fluence that is too low would merely deposit the energy and would ultimately destroy the pinhole. Conversely, the plasma must not be too dense, so that the expansion time is not too rapid and the pinhole is closed up, and a part of the beam is cut, as by the effect of a high-speed shutter.

In systems at 10 Hz, the number of reproducible firings required to validate the proper functioning of the pinhole increases relative to the single-shot systems by several orders of magnitude, and for this reason other solutions are proposed, which do not involve ablation of material, however slight.

Dielectric filter pinholes [3, 4] are a solution under consideration which reduce the deposition of energy in the material, and which is as a consequence less limited by the resistance of the material used to the flux. The effective field and the transmission in the case of reflection on a dielectric depend on the polarization and on the angle between the incident beam and the normal to the surface, according to Fresnel's formulae. Under these conditions the use of a conical pinhole with grazing incidence makes it possible to clean, in a spatial filter under vacuum, much higher energy pulses than with the standard solution. The microscopic quality of the surface of the reflector determines the resistance to flux and the performance of the pinhole, because of local increases in the electric field due to defects.

BRIEF SUMMARY OF THE INVENTION

However, the existing methods of shielding are not always satisfactory for all operating conditions of high-power laser apparatuses.

The aim of the present invention is to propose a method of shielding that makes it possible to limit the risks of damage in a high-power laser apparatus, and which is more effective than the methods used at present.

This objective is achieved with a method for shielding a high-power laser apparatus in which a laser beam is generated and then amplified in at least a first amplification stage, comprising spatial filtering of said amplified laser beam, phase correction performed on the laser beam prior to its spatial filtering, and measurement of aberrations carried out on the laser beam.

According to the invention, the phase correction of the beam is controlled so as to produce a beam with minimized aberrations after spatial filtering.

Thus, providing phase correction upstream of the spatial filter pinhole offers better control of the function of spatial filtering and makes it possible to avoid deterioration of the high-power apparatuses.

In fact, to perform the role of shielding the optical elements of a high-power laser more effectively and reduce the risks of damage connected with the two main causes described above, the present invention proposes the concept of an optical fuse by combining a filter pinhole that is small enough to perform a very effective filtering function (typically less than a few times the diffraction limit, typically less than 10) with a phase correction system positioned upstream of the filter pinhole, the main function of which is to permit, in nominal operation, focusing of the laser beam that is sufficiently close to the ideal spot (close to the limit set by diffraction) so that almost all of the energy passes through the filter pinhole.

The role of a filter pinhole is:
  on the one hand, to remove, from the wave front of the laser beam, all of the residual aberrations at spatial frequencies that can give rise, by propagation, to hot spots on the laser beam. These residual aberrations are aberrations which are: either generated by the laser upstream of the correction system and cannot be corrected by the correction system (insufficient degree of freedom in the correcting element, for example), or generated by the correcting element itself (for example, printing effect of a deformable mirror of the bimorphic type). Thus, the beam coming from the filter pinhole no longer presents risks of damage by propagation of the optical elements located directly downstream;
  on the other hand, to block the bulk of any luminous flux returning from the target, which can itself be amplified by the amplifiers located between the target and the filter pinhole. The smaller the diameter of the filter pinhole, the better the blocking of the flux returning from the target is. In this configuration, the filter pinhole provides shielding of the optical elements upstream (located between the generation of the laser beam and the filter pinhole).

When, for any reason (poor functioning of the laser on a firing, poor correction of the correction system etc.), the aberrations at spatial frequencies that can give rise, by propagation, to hot spots are very important, most of the flux is blocked by the pinhole, thereby shielding the optical elements located downstream. In certain cases, the flux blocked by the filter pinhole can cause its destruction (partial fusion and closing-up): hence the concept of the optical fuse. It is then necessary to change the pinhole, but the delicate and expensive optical elements located downstream have been shielded.

It is important to note that the method of shielding according to the invention can be employed with a phase correction module in which the laser beam makes a single pass, so that this phase correction module, the filter pinhole and the aberration measuring module constitute a homogeneous assembly performing the function of an optical fuse.

Moreover, the method of shielding according to the invention can be used advantageously for high-intensity, high-power lasers, with repetition frequency greater than at least 0.1 Hz.

The system for correcting the wave front is constituted by a correcting element and a system for measuring the aberrations and a software for calculating the command to be sent to the correcting element depending on the response of the system for measuring the aberrations. The correcting element can be a deformable mirror (of bimorphic or monomorphic type, with piezoelectric actuators, with mechanical actuators, with electromagnetic actuators, with electrostatic actuators, with a continuous or segmented reflecting membrane, etc.) or a liquid-crystal valve (pixelated or non-pixelated) for example. The system for measuring the aberrations can be a wave front analyzer of the Hartmann type, Shack Hartmann, a curvature analyzer, an interferometer (of the "shearing" or "point diffraction interferometry" type) or a simple matrix detector positioned approximately in the focusing plane (or an image thereof) of the beam.

The pinhole can be dimensioned in relation to the capacities of the deformable mirror, and the spatial filter takes over from the deformable mirror starting from the spatial frequencies that cannot be corrected by the deformable mirror itself.

When a problem, whatever its cause, affects the phase of the laser, the focusing spot on the pinhole expands: the filter pinhole performs its function and blocks most of the incident flux. If the problem is serious, the flux incident on the walls of the pinhole can be sufficiently powerful to degrade the pinhole to the point of closing it up. In this case, light can no longer pass through it and the pinhole performs its shielding function (the "fuse" concept).

However, it can happen that the problem is serious enough for a consequent flux to be blocked by the pinhole, which is degraded in an uncontrolled manner but not sufficiently to close it up. In this case it is important to stop the laser automatically and as quickly as possible to shield the optical elements of the laser as it is not possible to predict the effect of partial degradation of the filter pinhole on the beam partially passing through it.

For this purpose, it is possible to provide a system for warning of degradation of the filter pinhole. For example, a camera is positioned so as to image the pinhole and detect the diffusion of light on the edge of the pinhole at the first sign of a problem. This warning system can then pass the stop information to the laser control system.

In order to provide automatic control of the phase correction, the measurement of aberrations can be carried out according to several options.

In a first option, the measurement of aberrations is carried out before the spatial filtering of the corrected laser beam.

In a second option, the measurement of aberrations is carried out after the spatial filtering of the corrected laser beam. It is then possible to provide a translation of the spatial filtering means in a direction approximately orthogonal to the direction of the spatially filtered beam, so as to withdraw the spatial filtering means from the beam to permit measurement of the aberrations of the wave front.

In an advantageous embodiment of the invention, a fraction of the corrected laser beam is sampled and is then subjected to a measurement of aberrations.

The spatial filtering of the laser beam is provided by a filter pinhole the size of which is advantageously selected so as to eliminate, from the beam, the aberrations at spatial frequencies that can give rise, by propagation, to serious surges in this beam.

As a non-limiting example, the size of the filter pinhole is selected to be approximately less than ten times the diffraction limit of the laser beam.

It is also possible to provide for positioning the phase corrector of the laser beam at the entrance of an amplification module and positioning the filter pinhole at the exit of this amplification module. In this case, the analyzer is advantageously positioned at the exit of the amplification module to take into account the aberrations connected with the amplification.

According to another aspect of the invention, a device is proposed for shielding a high-power laser apparatus comprising means
for generating a laser beam and first means for amplifying this laser beam, this device comprising spatial filtering means receiving said laser beam, means for correcting the phase of the beam arranged upstream of the spatial filtering means, and means for measuring aberration arranged downstream of the phase correction means.

The means for correcting the phase of the beam are controlled so as to produce a beam with minimized aberrations after spatial filtering.

The shielding device according to the invention is preferably equipped with means for observing the spatial filtering means so as to detect degradation of these spatial filtering means.

In the first option for carrying out the invention, the means for measuring aberration are arranged upstream of the spatial filtering means.

In the second option for carrying out the invention, the means for measuring aberration are arranged downstream of the spatial filtering means. In this option, the shielding device according to the invention is advantageously equipped with means for effecting translation of the spatial filtering means in a direction approximately orthogonal to the direction of the beam coming from the spatial filtering means.

In an advantageous embodiment of the invention, the shielding device according to the invention additionally comprises means for sampling a fraction of the laser beam downstream of the phase correction means and directing this fraction towards the means for measuring aberration.

In a practical embodiment of a shielding device according to the invention, the phase correction means comprise a deformable mirror which can be of bimorphic or monomorphic type or a liquid-crystal valve.

The system for measuring the aberrations can be an analyzer of the Hartmann type, Shack Hartmann type, curvature type, or an interferometer, or even a simple matrix detector.

According to yet another aspect of the invention, a high-power-laser optical system is proposed, comprising means for generating a laser beam, means for amplifying said laser beam,
means for spatially filtering said laser beam, means for focusing this spatially filtered beam onto a target, phase correction means upstream of said spatial filtering means, and means for measuring the aberration of the beam arranged downstream of said phase correction means, characterized in that the means for correcting the phase of the beam are controlled so as to produce a beam with minimized aberrations after spatial filtering.

The shielding method and device according to the invention can be employed in proton therapy apparatuses or in installations for experimentation at high peak laser power, for example at the terawatt level.

BRIEF DESCRIPTION OF THE DRAWINGS

Other advantages and characteristics of the invention will become apparent on examination of the detailed description of an embodiment which is in no way limitative, and the attached diagrams, in which:

FIG. 1 diagrammatically illustrates a high-power optical system according to the invention;

FIG. 2 diagrammatically illustrates a first option for implementing a shielding device according to the invention;

FIG. 3 diagrammatically illustrates a second option for implementing a shielding device according to the invention;

DETAILED DESCRIPTION OF THE PREFERRED EMBODIMENTS

Figure 4:
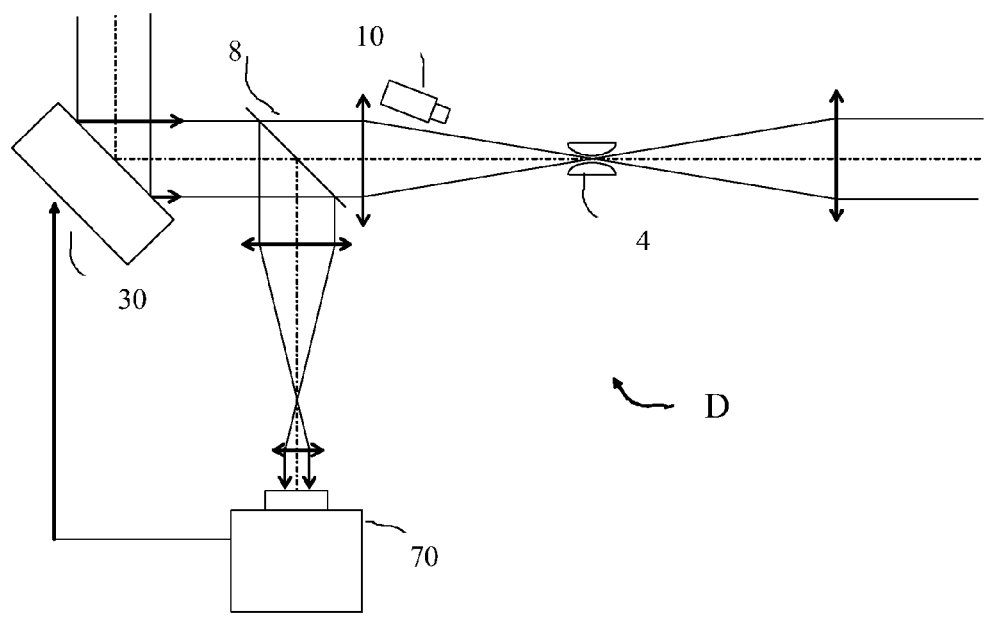
FIG. 4 illustrates, in more detail, a first example of implementation of a shielding device according to the invention in its first option.

Referring to the aforementioned figures, two options for implementing a shielding device according to the invention, employed in a high-power-laser optical system, will now be described.

Such an optical system S comprises, referring to FIG. 1, a module 1 for generating a laser beam, a module 2 for amplifying the beam, a shielding device D,D' according to the invention, and a module 5 for amplification and/or for compression and for focusing towards a target 6.

It should be noted that for greater clarity, the mirrors, lenses and other afocals for beam shaping and transport are not shown in FIG. 1.

The shielding device D,D' according to the invention comprises a phase correction module 3 arranged downstream of the amplification module 2, a spatial filter pinhole 4 arranged between the exit of this correction module 3 and the entrance of the amplification module 5, and an aberration measuring module 7.

In a first option for carrying out the invention, the shielding device D according to the invention comprises, referring to FIG. 2, an optical apparatus 8 for sampling a fraction of the beam coming from the phase correction module 3 and directing this beam fraction towards the aberration measuring module 7, which is thus arranged upstream of the spatial filter pinhole 4.

In a second option for carrying out the invention, the shielding device D' according to the invention comprises, referring to FIG. 3, an optical apparatus 8 for sampling a fraction of the beam coming from the spatial filter pinhole 4 and directing this beam fraction towards the aberration measuring module 7, which is thus arranged downstream of the spatial filter pinhole 4, as well as an apparatus 9 for effecting translation of this filter pinhole 4 to permit measurement of aberration directly on the beam coming from the phase correction module 3.

The aberration measuring module 7 supplies, to the phase correction module 3, the measurement data which are processed by a calculating module (not shown) to provide automatic control of the correcting elements. The calculating module can be a simple calculator or microcomputer, for example.

Referring to FIG. 4, the phase correction module comprises a deformable mirror 30 controlled on the basis of data supplied by a wave front analyzer 70 which receives, via a sampling module 8 comprising a dichroic mirror, a fraction of the beam coming from the deformable mirror 30. The shielding device D also comprises a camera 10 for imaging the spatial pinhole, said camera being provided for detecting overexposure of the spatial pinhole by the beam and for controlling the beam generating module 1. The filter pinhole 4 is for example of the dielectric type.

Figure 5:
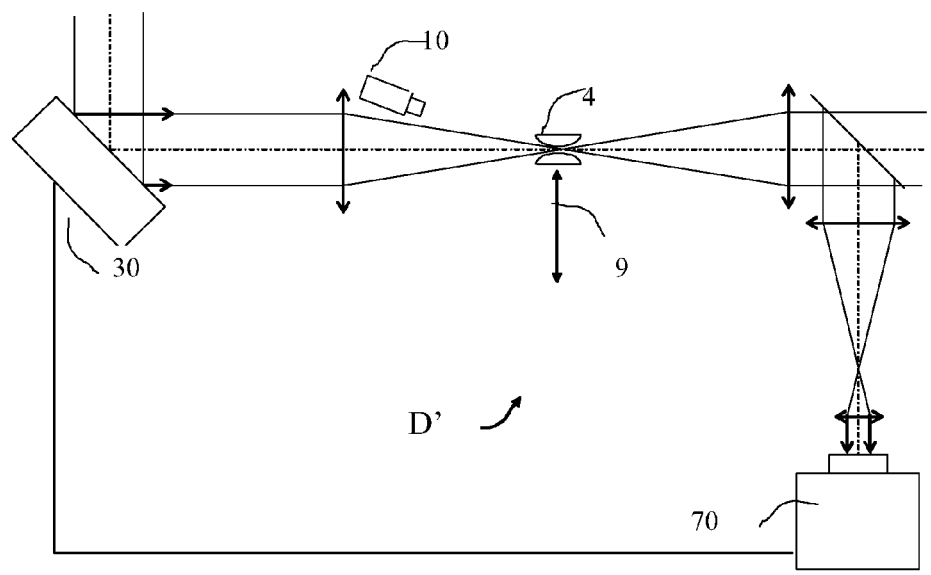
FIG. 5 illustrates, in more detail, a second example of implementation of a shielding device according to the invention in its second option.

Referring to FIG. 5, the beam sampling module 8 and the wave front analyzer 70 are arranged downstream of the filter pinhole 4.

Of course, the invention is not limited to the examples which have just been described and numerous adjustments can be made to these examples without exceeding the scope of the invention. Thus, other embodiments of the various modules for phase correction, for measuring aberration and for beam sampling can be envisaged.

REFERENCES

[1] Murray J. E., Milam D., Boley C. D., Estabrook K. G., and Caird J. A. (2000) "*Spatial filter pinhole development for the National Ignition Facility*", Applied Optics, 39 (9), pp. 1405-1420

[2] Celliers P. M., Estabrook K. G., Wallace R. J., Murray J. E., Da Silva L. B., MacGowan B. J., Van Wonterghem B. M., and Manes K. R. (1998) "*Spatial filter pinhole for high-energy pulsed lasers*", Applied Optics, 37 (12), pp. 2371-2378

[3] Hach H. and Neuroth N. (1982) "*Resistance of optical and colored glasses to 3-nsec laser pulses*", Applied Optics, 21 (18), pp. 3239-3248

[4] Kurnit N. A., Letzring S. A., Johnson R. P. (1999) "*A high-damage-threshold pinhole for glass fusion laser application*", Third Annual International Conference on Solid State Lasers for Application to Inertial Confinement Fusion, Proc. SPIE 3492, pp. 896-900

The invention claimed is:

1. A method for shielding a high-power laser apparatus in which a laser beam is generated and then amplified in at least a first amplification stage, comprising:
spatial filtering of said amplified laser beam by a filter pinhole, the laser beam being focused on the filter pinhole;
correcting the phase of the laser beam prior to the spatial filtering; and
measuring aberrations of the laser beam,
wherein the correcting the phase of the laser beam is controlled so as to produce the laser beam with minimized aberrations after the spatial filtering,
the filter pinhole is configured having a size to eliminate, from the laser beam, the aberrations at spatial frequencies that can give rise, by propagation, to surges in the laser beam, and
the laser beam passes through the filter pinhole only once.

2. The method for shielding according to claim 1, wherein the measuring aberrations is carried out before the spatial filtering of the laser beam.

3. The method for shielding according to claim 1, wherein the measuring aberrations is carried out after the spatial filtering of the laser beam.

4. The method for shielding according to claim 3, further comprising translating means for spatial filtering in a direction approximately orthogonal to a direction of the spatially filtered laser beam, so that said means for spatial filtering are withdrawn from said laser beam to permit the measuring aberrations of a wave front of the laser beam.

5. The method for shielding according to claim 1, further comprising sampling a fraction of the phase corrected laser beam, prior to the measuring aberrations.

6. The method for shielding according to claim 1, wherein the filter pinhole is sized to be approximately less than ten times a diffraction limit of the laser beam.

7. The method for shielding according to claim 1, further comprising detecting degradation of the filter pinhole.

8. A device for shielding a high-power laser apparatus, the apparatus comprising means for generating a laser beam and first means for amplifying the laser beam, the device comprising:
means for spatial filtering constructed and arranged to receive said amplified laser beam, the means for spatial filtering comprising a filter pinhole located at a position such that the laser beam is focused on the pinhole;
means for correcting a phase of the laser beam arranged upstream of said means for spatial filtering; and
means for measuring aberrations arranged downstream of said means for correcting the phase of the laser beam;
wherein the means for correcting the phase of the laser beam is controlled so as to produce the laser beam with minimized aberrations after spatial filtering by the means for spatial filtering,
the filter pinhole is configured having a size to eliminate, from the laser beam, the aberrations at spatial frequencies that can give rise, by propagation, to surges in the laser beam, and
the filter pinhole being disposed in the device such that the laser beam passes through the filter pinhole only once.

9. The device according to claim 8, further comprising means for detecting degradation of the means for spatial filtering.

10. The device according to claim 9, wherein the means for detecting degradation comprises a camera for imaging the means for spatial filtering.

11. The device according to claim 8, wherein the means for measuring aberrations is arranged upstream of the means for spatial filtering.

12. The device according to claim 8, wherein the means for measuring aberration is arranged downstream of the means for spatial filtering.

13. The device according to claim 12, further comprising means for effecting translation of the means for spatial filtering in a direction approximately orthogonal to a direction of the laser beam coming from said means for spatial filtering.

14. The device according to claim 8, further comprising means for sampling a fraction of the laser beam downstream of said means for correcting the phase of the laser beam and directing said fraction towards the means for measuring aberrations.

15. The device according to claim 8, wherein the means for correcting the phase of the laser beam comprises a deformable mirror.

16. A high-power-laser optical system, comprising:
means for generating a laser beam,
means for amplifying said laser beam,
means for spatially filtering said laser beam, the means for spatially filtering the laser beam comprising a filter pinhole located at a position such that the laser beam is focused on the pinhole,
means for focusing said spatially filtered beam onto a target,
means for correcting a phase of the laser beam upstream of said means for spatially filtering, and
means for measuring aberrations of the laser beam arranged downstream of said means for correcting the phase of the laser beam,
wherein the means for correcting the phase of the laser beam is controlled so as to produce the laser beam with minimized aberrations after spatial filtering by the means (4) for spatial filtering, the filter pinhole is configured having a size to eliminate, from the laser beam, the aberrations at spatial frequencies that can give rise, by propagation, to surges in the laser beam, and the filter pinhole being disposed in the device such that the laser beam passes through the filter pinhole only once.

17. The high-power-laser system according to claim 16, further comprising means for amplifying the laser beam coming from the means for spatial filtering.

18. The high-power-laser system according to claim 16, further comprising means for compressing the laser beam coming from the means for spatial filtering.

19. The high-power-laser system according to claim 16, further comprising means for detecting degradation of the means for spatial filtering.

20. The high-power-laser system according to claim 16, wherein the means for measuring aberrations is arranged upstream of the means for spatial filtering.

21. The high-power-laser system according to claim 16, wherein the means for measuring aberrations is arranged downstream of the means for spatial filtering.

22. The high-power-laser system according to claim 21, further comprising means for effecting translation of the means for spatial filtering in a direction approximately orthogonal to a direction of the laser beam passing through said means for spatial filtering.

23. The high-power-laser system according to claim 16, further comprising means for sampling a fraction of the laser beam downstream of said means for correcting the phase of the laser beam, and for directing the sampled fraction towards the means for measuring aberrations.

24. An application of the method for shielding according to claim 1, in a proton therapy apparatus.

25. An application of the method for shielding according to claim 1, in an installation for experimentation at high peak power.

* * * * *